United States Patent [19]

Bridgeford

[11] 4,137,947

[45] Feb. 6, 1979

[54] INTERNALLY COATED SAUSAGE CASING WITH IMPROVED MEAT RELEASE COMPOSITION

[75] Inventor: Douglas J. Bridgeford, Champaign, Ill.

[73] Assignee: Teepak, Inc., Chicago, Ill.

[21] Appl. No.: 837,080

[22] Filed: Sep. 28, 1977

[51] Int. Cl.[2] ........................ F16L 11/02; A22C 13/00

[52] U.S. Cl. ................................. 138/118.1; 426/105; 426/135; 426/413; 426/415; 426/420; 156/289; 138/145

[58] Field of Search ............................. 138/118.1, 145; 426/105, 135, 413, 420, 811; 156/289; 17/42

[56] References Cited

U.S. PATENT DOCUMENTS

| | | | |
|---|---|---|---|
| 3,262,789 | 7/1966 | Broumand et al. | 426/420 |
| 3,451,827 | 6/1969 | Bridgeford | 426/420 |
| 3,558,331 | 1/1971 | Tarika | 426/90 |
| 3,818,947 | 6/1974 | Rose | 138/118.1 |
| 3,884,270 | 5/1975 | Rasmussen et al. | 138/118.1 X |
| 3,898,348 | 8/1975 | Chiu et al. | 138/118.1 X |
| 3,906,117 | 9/1975 | Gawrilow | 426/420 |

FOREIGN PATENT DOCUMENTS 2300338 8/1973 Fed. Rep. of Germany.

*Primary Examiner*—Richard E. Aegerter
*Assistant Examiner*—James E. Bryant, III
*Attorney, Agent, or Firm*—Paul Shapiro; Joseph E. Kerwin; William A. Dittmann

[57] ABSTRACT

This invention relates to an artificial sausage casing of regenerated cellulose having a coating composition applied over the internal surface thereof which exhibits excellent meat release from sausages processed therein under high speed mechanical peeling and has improved resistance to strand breakage and pinholing during shirring and meat processing, the coating being an admixture of a water-soluble cellulose ether, a partial fatty acid ester of sorbitan or mannitan and a water-soluble polyalkylene glycol ether having the formula $RO(-C_2H_4O)_n-H$ wherein R represents long chain alkyl radicals having 8 to 16 carbon atoms and n is an integer from 4 to 40.

12 Claims, No Drawings

INTERNALLY COATED SAUSAGE CASING WITH IMPROVED MEAT RELEASE COMPOSITION

BACKGROUND OF THE INVENTION

1. Field of the Invention

This invention relates to cellulose food casings and more particularly to internal coatings for the casings which impart meat release characteristics and improve the strand strength properties of the casing.

2. The Prior Art

In the manufacture of regenerated cellulose sausage casings viscose is extruded through an annular die into a coagulating and regenerating bath to produce a tube of regenerated cellulose. The tube is subsequently washed, plasticized with glycerin, and dried while inflated under a substantial air pressure. After drying, the casing is wound on reels and subsequently shirred on high speed shirring machines, such as those described in U.S. Pat. Nos. 2,010,626; 2,583,654; 2,722,714; 2,722,715; 2,723,201 and 3,451,827. In the shirring process, lengths of from 40–200 feet of casing are compacted into strands of a few inches, e.g., 4–30 inches. The shirred casing strands are packaged and sold to the meat processor wherein the casings are stuffed with a meat emulsion, the meat cooked, and the casing removed from the meat processed therein with high speed peeling machines.

It has been proposed to lubricate and internally humidify cellulose casings on a shirring machine by spraying a mist of water and a stream of lubricant through the shirring mandrel to increase the flexibility of the casing and to prevent casing film breakage, referred to in the art as "pinholing". Lubricants typically used in the shirring operation for aiding and assisting passage of the casing over the shirring mandrel include food grade vegetable, mineral, or silicone oils.

Recently it has been proposed (e.g., U.S. Pat. No. 3,898,348) to coat the internal surfaces of cellulose sausage casings with a homogeneous admixture of a water-soluble cellulose ether and an additive selected from animal, vegetable, mineral and silicone oils and alkylene oxide adducts of partial fatty acid esters. The coating is applied to the casing surface in a proportion such that the additive is present in a proportion of at least 0.1 times the weight of the water-soluble cellulose ether but no more than 0.5 mg. per square inch of casing surface.

Casings coated with the meat release coating compositions of U.S. Pat. No. 3,898,348, although exhibiting excellent peelability characteristics have deficient strand strength characteristics, i.e., the strand is fragile and tends to break on doffing or when the strand is stuffed.

SUMMARY OF THE INVENTION

Improvements in the peelability of cellulose sausage casings and strand strength can be obtained in accordance with the present invention wherein a casing of cellulose has applied over the internal surface thereof a coating comprised of a homogeneous admixture of a water-soluble cellulose ether, a partial fatty acid ester of sorbitan or mannitan and a water-soluble poly-alkylene ether of the type $R(-OC_2H_4O)_n-H$ wherein R represents long chain alkyl radicals having 8 to 16 carbon atoms and n is an integer from 4 to 40. In preparing the casing, an aqueous coating composition containing the water-soluble cellulose ether, partial fatty acid ester and polyalkylene ether is applied to the interior of the sausage casing prior to shirring.

Artificial cellulose casings of the present invention have excellent peelability under high speed mechanical peeling conditions and can be shirred on high speed shirring machines without a substantial frequency of breakage. The shirred casings of the present invention can be readily deshirred under high speed stuffing operations without substantial breaking or pinholing. The casing has sufficient strand strength to withstand normal handling required for providing end closures in the casing and placement in high speed stuffing machines.

PREFERRED EMBODIMENTS

Water-soluble cellulosic ethers suited for practicing the invention include carboxymethyl cellulose, hydroxypropyl cellulose, methyl cellulose, ethylhydroxy ethyl cellulose, hydroxyethyl cellulose, carboxymethyl hydroxyethyl cellulose, and hydroxypropyl methyl cellulose. Quite often, the cellulose ethers are sold as salts, particularly the sodium salt. For purposes of this invention, reference to a water-soluble cellulose ether is intended to encompass the alkali and alkaline earth metal salts. In a preferred embodiment of the invention, the water-soluble cellulose ether is a low molecular weight carboxymethyl cellulose having from 5–15 carboxymethyl groups per 10 anhydroglucose units. The cellulose ethers are included in the coating composition primarily for the meat release properties they impart to the casing surface. The cellulosic ethers may be supplemented by other cellulosic release agents such as hemicellulose, carboxyl oxidized dextrin and carboxymethylated starch.

The coating composition which is applied to the interior of the casing surface contains from about 0.5 to about 2.5% by weight of the cellulose ether. This level of cellulose ether in the coating composition when applied on the casing yields about 0.01 to about 0.1 milligrams (mg.) cellulose ether per square inch ($in^2$) of casing surface. In a preferred embodiment, the coating composition is applied to produce from about 0.025 to about 0.06 mg. cellulose ether per square inch of casing surface. Levels of cellulose ether below about 0.01 mg./$in^2$ on the interior of the casing surface often result in a casing lacking the meat release properties necessary for high speed peeling operations practiced in commercial sausage manufacturing plants. When the level of cellulose ether exceeds about 0.01 mg./$in^2$ of casing surface, the surface of the sausage often becomes undesirably slimy without enhancement of meat release characteristics.

The second essential component of the coating necessary for producing desired results in peelability and strand strength of the casing is a partial fatty acid ester of sorbitan or mannitan which is included in the coating combination containing the water-soluble cellulose ether. The partial fatty acid ester of sorbitan or mannitan is included in the coating composition primarily for its lubricative properties. The term "partial fatty acid ester of sorbitan or mannitan" includes within its meaning the palmitic, oleic and stearic acid esters. In a preferred embodiment of the invention, the partial fatty acid ester is a sorbitan ester, namely sorbitan trioleate.

The sorbitan or mannitan fatty acid esters are included in the coating composition of the present invention in a proportion of from about 0.25 to about 5% by weight. Preferably the partial fatty acid ester of sorbitan or mannitan is included in the coating composition at concentrations in the range of about 0.5 to about 2.5% by weight to provide effective proportions of lubricant in the coating of the casing. At these concentration levels, from about 0.01 to about 0.1 and preferably about 0.03 to about 0.06 mg./in$^2$ of casing surface of the partial fatty acid ester are applied to the casing.

The third essential component of the coating necessary for producing the desired results in peelability and strand strength is a water-soluble polyalkylene glycol ether having the general formula $RO(-C_2H_4O)_n-H$ wherein R represents a long chain alkyl radical having from 8 to 16 carbon atoms and n is an integer from about 4 to 40.

The polyalkylene glycol ethers are incorporated in the coating composition primarily for the platicizing properties the compounds impart to the coating. The polyalkylene glycol ethers are the condensation products of long chain fatty alcohols and alkylene oxides. It is preferred in the practice of the present invention that the polyalkylene glycol ether be a polyoxyethylene ether of a higher fatty alcohol, such as lauryl alcohol and stearyl alcohol, and that the ether have relatively high solubility, e.g., 10 to 40% by weight, in water.

Illustrative of commercially available polyethers useful in the practice of the present invention include those sold under the designation "Brij" by Atlas Chemical Industries of Delaware, for example, "Brij 35" (polyoxyethylene (23) lauryl ether), "Brij 76" (polyoxyethylene (10) stearyl ether), "Brij 56" (polyoxyethylene (10) cetyl ether), and "Brij 58" (polyoxyethylene (20) cetyl ether).

The numbers in parenthesis indicate the number of oxyethylene groups in each polyether. Brij 35, which is preferred in the practice of the present invention, is soluble in water to the extent of 35% by weight at 25° C.

It is critical to the practice of the present invention that the polyalkylene glycol ether be included in the coating composition in a proportion of from about 0.025 to about 0.20% by weight and preferably about 0.05 to about 0.10% by weight. At these proportions the polyalkylene glycol ether is applied to the internal surface of the casing at a level of from 0.00125 to 0.01 mg/in$^2$ and preferably 0.0015 to 0.005 mg/in$^2$ of casing surface.

As will hereinafter be illustrated, at concentrations less than about 0.025% by weight the presence of the polyether is insufficient to effect an improvement in casing pinholing and at concentrations substantially in excess of 0.2% by weight, the strand becomes extremely fragile and is then vulnerable to breakage during deshirring.

Thus, the coating compositions of the present invention are homogeneous admixtures containing from about 0.5 to about 2.5% of a water-soluble cellulose ether, about 0.25 to about 5% by weight of a partial fatty acid ester of sorbitan or mannitan, about 0.025 to about 0.2% by weight of the polyalkylene glycol ether and the balance being water.

The coating compositions of the present invention are applied to the casing prior to shirring and a number of ways are suited. A preferred means of introducing the coating composition to the interior of the casing is immediately prior to the actual shirring process using the apparatus described in U.S. Pat. No. 3,451,827, whereby the coating composition is applied to the internal casing surface through the mandrel on which the casing is shirred. An alternative to application by the shirring mandrel is to coat the interior of the casing by a slug technique which comprises introducing a quantity of the aqueous coating material into the casing either prior or subsequent to the casing drying operation. Slug coating of the interior of small diameter sausage casings, however, is not generally favored in commercial processes because of the high speeds involved and the difficulty in applying a uniform level of coating composition over the internal surface of the casing. The apparatus described in U.S. Pat. No. 3,451,827 is much more effective and is easier to use for the high speed coating of the interior of sausage casings.

The following examples are provided to illustrate the invention and are not intended to restict the scope thereof. All percentages are expressed as weight percentages.

EXAMPLE I

Regenerated cellulose sausage casings of varying diameters (18.0–20.5 mm) were prepared by spraying a coating composition containing 0.75% CMC 7L1, 1% Span 85, 0.05% Brij 35 and the balance water onto the interior of the casing surface prior to shirring using the apparatus described in U.S. Pat. No. 3,451,827. The shirred strands were humidified to a moisture level of 15.1–17.6%.

CMC 7L1 is carboxymethyl cellulose having an average substitution of 7 carboxymethyl groups per 10 anhydroglucose units commercially available from Hercules, Inc., Span 85 soribitan trioleate commercially available from Atlas Chemical as is Brij 35 which is polyoxyethylene (23) lauryl ether. The proportion of composition added to each casing is adjusted to produce about 0.026 mg. CMC, 0.036 mg. Span 85, and 0.0018 mg. Brij 35, per square inch of casing surface.

The strength of the shirred strands was determined by a strand strength test wherein the strand to be tested was clamped in a cylindrical one inch wide rubber-lined clamp with one end of the strand projecting horizontally from the clamp to create a lever arm. A thin loop was hung around the strand 7.5 cm. from the edge of the clamp in a plane perpendicular to the axis of the strand. A bucket was attached to the loop and water was flowed into the bucket to create a constantly increasing downward force of 750 grams/minute which effected breakage of the strand within 15 seconds.

The test was conducted in an atmosphere of 50% relative humidity and a temperature of 20° C.

The force required to break the strand multiplied by the distance between the break and the original loop position is defined as the breaking moment or strand strength. The higher the value of the breaking moment in gram-centimers (g-cm) the greater is the strand strength. The strand strengths of different diameter casings internally coated with the CMC/Span 85/Brij 35 coating composition are summarized in Table I below.

The total number of strands broken during mechanical doffing of the shirred strand from the shirring machine mandrel or during handling of the shirred strand by the machine operator either while closing one end of the strand or during placement of the strand in the shipping caddy was noted and recorded. The number of strands broken in a 300 strand sampling are also summarized in Table I.

For purposes of comparison, regenerated cellulose casings were internally coated in accordance with the procedure set forth in Example I with a comparative coating composition composed of 0.75 CMC 7L1, 1%

Span 85, 0.5% GMO, 0.25% Tween 80, and the balance water.

GMO is a mixture of mono and diglycerides of oleic acid having a monoglyceride content of about 46%, a diglyceride content of about 46% and the balance being triglycerides of oleic acid and fatty acids commercially available from the Glidden-Durkee Division of SCM Corporation. Tween 80 is an ethoxylated (20) sorbitan monooleate commercially available from Atlas Chemical Company. The comparative casings were found to have substantially lower strand strength and a frequency of breakage substantially higher than the casings of Example I.

The strand strengths and broken strands of the comparative coated casings designated by the symbol "C" are also recorded in Table I below.

TABLE I

| Run No. | Strand Diameter (mm) | Strand Strength (gm-cm)* | Strands Broken |
|---|---|---|---|
| 1 | 18.0–19.0 | 2883 | 1 |
| $C_1$ | 18.0–19.0 | 1529 | 81 |
| 2 | 19.0–20.0 | 2889 | 2 |
| $C_2$ | 19.0–20.0 | 2106 | 27 |
| 3 | 19.5–20.5 | 2841 | 4 |
| $C_3$ | 19.5–20.5 | 2124 | 15 |

*Average of 9 tests

EXAMPLE II

Cellulose sausage casings of 19.5–20.5 mm. diameter were internally coated in accordance with the procedure of Example I with the exception that the amount of Brij 35 in the coating composition was varied from 0.05%–0.4% by weight. Thirty strands were coated at each different level of Brij 35 concentration.

The coated shirred casings were stuffed at a meat packing house for making frankfurters and cooked and smoked under identical conditions.

The meat release characteristics or peelability of the casing as well as the ability of the casing to withstand breakage during shirring and meat stuffing operations was evaluated. Peelability of the casing was determined by observing the link misses, i.e., the number of unpeeled links per strand which occur in the packing house during sausage processing using the coated casings.

The number of casing defects, i.e., primarily the existence of pinholes, was determined by observing the performance of the coated strands during shirring and stuffing operations.

All of the casings evaluated exhibited excellent meat release characterisitcs from the sausages processed therein when tested by the peelability test. There appeared to be little difference in the meat release characteristics of any of the sausage casings tested. Strand defects were in the commercially acceptable range.

The peelability and defects of the strands coated in accordance with the present invention are recorded in the following Table II.

TABLE II

| Run No. | Concentration Brij. 35 (%) | Peelability* Misses/Strand | Defects % |
|---|---|---|---|
| 1 | 0.05 | 0.29 | 6.7 |
| 2 | 0.075 | 0.57 | 3.3 |
| 3 | 0.125 | 0.43 | 6.7 |
| 4 | 0.20 | 0.0 | 13.0 |
| 5 | 0.40 | 0.14 | 3.3** |

*Average of 7 strands
**Unacceptable diminution in strand strength

EXAMPLE III

The procedure of Example II was repeated at a second and different meat processing plant using a Brij 35 concentration of 0.05% and casing of varying diameters.

The peelability and defects of the coated strands are recorded in Table III below.

TABLE III

| Run No. | Strand Diameter (mm.) | Peelability* Misses/Strand | Defects % |
|---|---|---|---|
| 1 | 18.0–19.0 | 0 | 3 |
| 2 | 19.0–20.0 | 0 | 0 |
| 3 | 22.0–23.0 | 0 | 0 |

*Average of 72 strands

EXAMPLE IV

The procedure of Example III was repeated using varying concentrations of CMC. The observations of operating personnel who worked with the internally coated shirred strands were recorded and these observations are summarized in Table IV below.

For purposes of comparison, the procedure of Example IV was repeated with the exception that either one of the three essential components of the composition of the present invention was absent from the coating composition or a component not within the scope of the present invention, e.g., Tween 80 was substituted for one or more of the essential components of the coating compositions of the present invention.

The observations of operating personnel who used the comparatively coated strands designated by the symbol "C" are also summarized in Table IV.

TABLE IV

| | CONCENTRATION OF COATING COMPOSITION | | | | | |
|---|---|---|---|---|---|---|
| Run No. | Strand Diameter (mm.) | CMC % | Span 85 % | Brij 35 % | Tween 80 % | Observations |
| 1 | 19.5–20.5 | 0.75 | 1.0 | 0.05 | — | High strength strand. Minimal breakage during shirring, e.g., 2 broken strands in 3250 strands shirred. No defects in 100 strands examined. |
| 2 | 19.5–20.5 | 1.0 | 1.0 | 0.05 | — | High strand strength, pinholing averages 11% in 2 packing houses. |
| $C_1$ | 19.5–20.5 | 1.00 | 0.5 | 0.40 | — | Unacceptable strand breakage on doffing. |
| $C_2$ | 19.5–23.0 | 1.5 | 1.5 | — | — | Excessive pinholing, e.g., up to 70% in packing houses. |
| $C_3$ | 21.0–22.0 | 1.5 | 3.5 | — | — | Unacceptable strand |

TABLE IV-continued

| | CONCENTRATION OF COATING COMPOSITION | | | | | |
|---|---|---|---|---|---|---|
| Run No. | Strand Diameter (mm.) | CMC % | Span 85 % | Brij 35 % | Tween 80 % | Observations |
| | | | | | | breakage on doffing. |
| $C_4$ | 21.0–22.0 | 1.0 | 1.5 | — | — | Pinholing varies from 0 to 16% in 6 packing houses. Variable strand strength. |
| $C_5$ | 21.0–22.0 | 0.6 | 1.5 | — | — | Pinholing varies from 0 to 16%. Unacceptable strand strength. |
| $C_6$ | 21.0–22.0 | 0.6 | 3.5 | — | — | Pinholing varies from 6 to 30% in several packing houses. Unacceptable strand strength. |
| $C_7$ | 19.5–20.5 | 1.0 | — | 0.5 | — | Shirring machine jams. Unacceptable strand strength. |
| $C_8$ | 19.5–20.5 | 1.0 | — | 0.5 | — | Shirring machine jams. Unacceptable strand strength. |
| $C_9$ | 21.0–22.0 | 1.0 | 1.0 | — | 0.5 | Unacceptable strand strength. |
| $C_{10}$ | 15.3–16.3 | 0.75 | 1.0 | — | 0.25 | Unacceptable strand strength. |
| $C_{11}$ | 15.3–16.3 | 0.75 | — | — | 0.25 | Cannot shirr. |
| $C_{12}$ | 15.3–16.3 | 0.75 | — | 1.0 | — | Cannot shirr. |
| $C_{13}$[1] | 19.5–20.5 | 1.0 | — | 1.0 | — | Shirring machine jams. |

[1] Dispersed in 40% glycerol solution

By reference to Table IV it is immediately apparent that cellulose casings internally coated with the compositions of the present invention (Run Nos. 1–2) exhibit substantially improved strand strength and less pinholing when compared with cellulose casings internally coated with compositions outside the scope of the present invention (Run Nos. $C_1$–$C_{13}$).

What is claimed is:

1. A process for preparing an artificial sausage casing of regenerated cellulose having improved meat release properties and resistance to breakage which comprises: applying to the internal surface of the casing a substantially homogeneous aqueous coating composition containing a water-soluble cellulose ether, a partial fatty acid ester of a polyhydric alcohol selected from the group consisting of sorbitan and mannitan, and a water-soluble polyalkylene glycol ether of the formula $R(-OC_2H_4O)_n-H$ wherein R represents long chain alkyl radicals having 8 to 16 carbon atoms and n is an integer from 4 to 40.

2. The process of claim 1 wherein the coating composition applied to the casing contains about 0.5 to about 2.5% by weight of the cellulose ether, about 0.5 to about 5% by weight of the partial fatty acid ester and about 0.025 to about 0.20% by weight of the polyalkylene glycol, the balance being water.

3. The process of claim 1 wherein said cellulose ether is carboxymethyl cellulose.

4. The process of claim 1 wherein said partial fatty acid ester of a polyhydric alcohol is a partial fatty acid ester of sorbitan.

5. The process of claim 4 wherein said partial fatty acid ester of sorbitan is sorbitan trioleate.

6. The process of claim 1 wherein the polyalkylene glycol ether is polyoxyethylene (23) lauryl ether.

7. An artificial sausage casing of regenerated cellulose having a coating applied over the internal surface of the casing, said coating being a substantially homogeneous admixture of a water-soluble cellulose ether, a partial fatty acid ester of a polyhydric alcohol selected from the group consisting of sorbitan and mannitan, and a polyalkylene glycol ether having the formula $RO(-C_2H_4O)_nH$ wherein R represents long chain alkyl radicals having 8 to 16 carbon atoms and n is an integer from 4 to 40.

8. The artificial sausage casing of claim 7 wherein said carboxymethyl cellulose is applied in a proportion of from about 0.01 to about 0.10 mg. per square inch of casing surface, the partial fatty acid ester is applied in a proportion of from about 0.01 to about 0.10 mg. per square inch of casing surface and the polyalkylene glycol ether is applied in a proportion of from about 0.00125 to about 0.01 mg. per square inch of casing surface.

9. The artificial sausage casing of claim 7 wherein said cellulose ether is carboxymethyl cellulose.

10. The artificial sausage casing of claim 7 wherein said partial fatty acid ester of a polyhydric alcohol is a partial fatty acid ester of sorbitan.

11. The artificial sausage casing of claim 10 wherein said partial fatty acid ester of sorbitan is sorbitan trioleate.

12. The artificial sausage casing of claim 7 wherein the polyalkylene glycol ether is polyoxyethylene (23) lauryl ether.

* * * * *